3,169,044
DIHYDROGEN DODECAHYDRODODECABORATE AND METHOD FOR PRODUCING SAME
Henry C. Miller, Wilmington, Del., and Earl L. Muetterties, West Chester, Pa., assignors to E. I. du Pont de Nemours and Company, Wilmington, Del., a corporation of Delaware
No Drawing. Filed May 20, 1960, Ser. No. 30,441
6 Claims. (Cl. 23—14)

This invention relates to a novel boron-containing acid and to methods for its preparation.

Compounds of boron and hydrogen whose properties are described in the literature are limited to products having at most 10 boron atoms. The known covalent hydrides include such compounds as $B_2H_6$, $B_5H_9$, $B_5H_{11}$, and $B_{10}H_{14}$. Known derivatives of borohydride anions include salts of $BH_4^{-1}$, $B_3H_7^{-1}$, $B_{10}H_{13}^{-1}$ and $B_{10}H_{12}^{-2}$. Free acids having these anions are unknown; in fact, acidification of aqueous solutions of salts of the above anions results in rapid decomposition of the boron compounds. In particular, no free acids, or even salts, of hydroborates are known in which there are 12 or more boron atoms and the molar ratio of boron to hydrogen in the anion is 1.

This invention is directed to a highly unusual and very useful dibasic acid of a hydroborate which acid consists of two ionizable hydrogens and a divalent anion consisting of 12 borons and 12 hydrogens. By ionizable hydrogens, we mean hydrogens which form $H^+$ ions in aqueous solution and which can be neutralized with an inorganic aqueous base, e.g., sodium hydroxide.

More specifically, this new acid is a white crystalline hygroscopic, non-volatile, solid compound of boron and hydrogen having for each 6 boron atoms one acidic ionizable hydrogen atom and six non-acidic non-ionizable hydrogen atoms, such compound being characterized by having infrared adsorption bands at $4.0\mu \pm 0.10$ and $9.35\mu \pm 0.10$, a pKa of about 2 at 25° C. It is a solid at temperatures below about 80° C.

The acid of this invention is believed to be represented by the following empirical formula:

(1)  

The acid will be termed herein dihydrogen dodecahydrododecaborate (2−). It is noted that no official system of naming of boron compounds has been adopted at the present time. The nomenclature used herein follows the proposals made by a group of the Committee on Nomenclature of the American Chemical Society Division of Organic Chemistry. These proposals are discussed in (1) a paper presented by G. W. Schaeffer at the American Chemical Society Meeting, San Francisco, California, April 13–18 (1958), (2) a paper presented by K. L. Loening to the Division of Chemical Literature, American Chemical Society Meeting, Chicago, Illinois, September 7–12 (1958), and (3) a publication by Patterson, Chemical Engineering News 34, 560 (1956).

The new compound is a strong acid which can be neutralized with strong inorganic bases and it shows an equivalence point at a pH of 7. In aqueous solution at 25° C. the acid has a pKa value of about 2.0 as noted above. One or both of the acidic hydrogens can be replaced to form monobasic or neutral salts.

The acid is readily soluble in water and it is, in fact, rather hygroscopic. In view of this property, it is conveniently isolated as a hydrate in which the number of moles of water of hydration (or crystallization) is determined to some extent by the intensity and duration of the drying of the acid. In general, the maximum number of moles of water of crystallization does not exceed 4.

Generically, therefore, the acid and its hydrates are represented by the empirical formula (2)  

where $n$ is a cardinal whole number of at most 4, i.e., $n$ is 0, 1, 2, 3, or 4. Two moles of water of hydration are considered to be associated with the protonic (acidic) hydrogens and the hydrated acid can, optionally, be represented by the following empirical formula:

(2a)  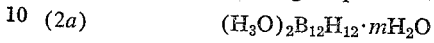

where $m$ is a cardinal number of at most 2, i.e., $m$ is 0, 1, or 2.

The novel acid is soluble in other oxygenated solvents, e.g., ethers, alcohols, esters, and the like. Solutions of the acid in these solvents can, if desired, be facilitated by adding a very minor quantity of water.

The novel acid and its hydrates, are white crystalline solids which show characteristic and identifying absorption bands in the infrared spectrum at $4.0\mu \pm 0.10$ and $9.35\mu \pm 0.10$.

The strong tendency of the acid to form hydrates makes it difficult at times to determine the exact molar ratio of boron to hydrogen in the anion solely on the basis of elemental analyses. However, such analyses, considered in combination with the characterizing, but heretofore unknown, infrared absorption spectrum permits positive identification of the product. Confirmation of the $H_2B_{12}H_{12}$ formula is also obtained by conversion of the solvated acid to a solvate-free salt, e.g., a substituted phosphonium salt, showing the same characteristic infrared absorption bands at $4.0\mu \pm 0.10$ and $9.35\mu \pm 0.10$ as the free acid.

The novel acid, particularly the dodecahydrododecaborate anion, shows unusual stability for a hydroborate. To illustrate, an aqueous solution of the acid containing 5% hydrogen chloride has been refluxed for 1 hour with no evidence of hydrolysis of the dodecahydrododecaborate anion. This remarkable stability of the dodecahydrododecaborate anion is in striking contrast to the low stabilities of known hydroborates, e.g., tetrahydroborate ($BH_4^-$), octahydrotriborate ($B_3H_8^-$), and the like, which decompose rapidly even at 25° C. when solutions of their salts are acidified.

The novel acid is obtained by contacting a solution of salt containing a dodecahydrododecaborate anion with a strong acid. The reaction is a metathesis in which an exchange of cations occurs. Strong acid reactants which are used should, preferably, have a pKa valve which is lower than or, at least, approximately equal to, the pKa value for $H_2B_{12}H_{12}$. Strong inorganic or mineral acids can be conveniently employed, e.g., hydrochloric acid, sulfuric acid, phosphoric acid, and the like. Strong organic acids can also be employed, e.g., polyhalogenated acetic acids or substituted aromatic sulfonic acids. In general, the acid reactant should have a pKa value less than that of the dihydrogen dodecahydrododecaborate (2−).

The reaction is most conveniently conducted in aqueous solution. However, solvents other than water can be employed, if desired. Examples of nonaqueous solvents include alcohols such as methanol, ethanol, or cyclohexanol; esters such as methyl acetate, butyl propionate, or ethyl butyrate; ethers such as glyme, or dioxane; nitriles such as acetonitrile or benzonitrile; carboxylic acids such as acetic acid or propionic acid; and the like. The solution of the acid, as obtained in the reaction, can be employed directly for many uses without separation of by-product salts.

A substantially salt-free (i.e., pure) solution of the acid is obtained by maintaining an aqueous solution of a dodecahydrododecaborate (2−) salt in contact with an acidic ion-exchange resin for a time sufficient to exchange the cation of the salt for the acidic hydrogen of the ion-exchange resin. The solution, after contact with the ion-exchange resin, can be evaporated by conventional procedures to obtain the acid, generally as a hydrate. By intensive and prolonged drying under reduced pressure, a substantially hydrate-free product can be obtained.

The ion-exchange resins employed in the process are, preferably, of the sulfonic acid variety, which are available commercially, e.g., "Amberlite" IR–120–H, acid form and "Dowex" 50.

The acid is isolated from its solvent carrier and other dissolved salts formed in metathesis by the wellknown, conventional separation procedures.

The dodecahydrododecaborate salt employed in the process is represented by the formula (3) $\quad M_a(B_{12}H_{12})_b$ where M is a cation having a valence of 1 through 4 and the values of $a$ and $b$ are determined by the valence of M, i.e., $a$ multiplied by the valence of M is equal to $2b$. The relationship between $a$ and $b$ is further shown by the following equation:

$$b = \frac{a \times \text{valence of M}}{2}$$

The values of $a$ and $b$ are the smallest numbers which satisfy the equation and these values lie between 1 and 3.

The alkali metal and alkaline earth metal salts are most conveniently used in the process and they are a preferred group. Thus, in Formula (3), M is preferably an alkali or alkaline earth metal, $a$ has a value of 1 or 2, and $b$ has a value of 1. In an especially preferred group, M is an alkali metal and $a$, therefore, is 2 and $b$ is 1, i.e., Formula (3) becomes $M_2B_{12}H_{12}$. The ammonium salt can also be used. When M is an alkali metal, an alkaline earth metal or ammonium ion, $a$ will be a positive whole number between 0 and 3, i.e., 1 or 2.

The dodecahydrododecaborate salts, employed as reagents, are conveniently prepared by the method illustrated in Examples A, B, and C. Briefly, the method consists in reacting diborane ($B_2H_6$) with an alkali or alkaline earth metal hydroborate under superatmospheric pressure (at least 3 atmospheres). Any alkali metal or alkaline earth metal hydroborate can be used but sodium and potassium hydroborates ($NaBH_4$ and $KBH_4$) are the most readily available salts and they, therefore, are most commonly used in the preparation of the dodecahydrododecaborate salts. The salts can be used as obtained without special purification steps.

Aqueous solutions of the salts are preferably used for contacting with the ion-exchange resin. Any convenient method of operation can be employed, e.g., mechanical mixing of the ion-exchange resin with the aqueous solution followed by filtration to separate the resin or by passing the aqueous solution through a column of the ion-exchange resin. The rate of reaction is rapid and time is not a critical factor in the process.

The aqueous solution, obtained after contact with the ion-exchange resin, contains the acid, $H_2B_{12}H_{12}$, and the solution is evaporated by any conventional means to obtain the solid acid. The solution can be evaporated, for example, by warming under reduced pressure, by flowing in thin layers over heated surfaces, by flashing into a chamber under reduced pressure and by other well-known procedures.

The product is stable in storage and it can be kept in conventional stoppered glass containers or in containers of other corrosion-resistant materials.

This application is a continuation-in-part of our co-pending application Serial No. 15,042, filed March 15, 1960, and now abandoned.

The examples which follow illustrate (1) the preparation of the alkali metal dodecahydrododecaborate (2−) which is employed as a reactant and (2) the preparation of the acid $H_2B_{12}H_{12}$.

Example A

A pressure vessel of 400 ml. capacity is charged with 9.5 g. of sodium hydroborate and 75 ml. of glyme. The vessel is closed, cooled to −80° C. and evacuated to a pressure of about 0.001 mm. of mercury. Diborane (14.0 g.) is charged into the vessel which is then sealed and heated with agitation under autogenous pressure for 10 hours at 120° C. The molar ratio of $NaBH_4$ to $B_2H_6$ in this reaction is 1:2. The reactor is cooled, the volatile products are released by venting and the contents of the tube are washed into a receiver with glyme. A suspension of a white solid in a yellow liquid is formed from which the solid is separated by filtration. The solid is dissolved in hot tetrahydrofuran and the solution is filtered to remove a trace of unreacted sodium hydroborate. The hot filtrate is diluted with glyme and chilled to yield 14.0 g. of a disodium polyhydropolyborate (2−) as long, glistening white needles. This compound is known to be disodium dodecahydrododecaborate (2−). The compound crystallizes with 1,2-dimethoxyethane and water. The compound has the following infrared absorption frequencies: 2.8μ, sharp, medium; 3.9μ with 4.02μ shoulder, sharp, strong; 6.2, 7.8 and 8.4μ, sharp, medium; 9.3μ, medium sharp, strong; 10.9μ, sharp, strong; and 13.9μ, broad weak.

*Analysis.*—Cal'd for $Na_2B_{12}H_{12} \cdot .89C_4H_{10}O_2 \cdot .56\ H_2O$: C, 15.37; H, 7.98; B, 46.67; Na, 16.49. Found: C, 15.52, H, 8.43; B, 47.12; Na 15.3.

The compound can be obtained as its hydrate free of ether solvation by recrystallization from a large quantity of diethyl ether or tetrahydrofuran/diethyl ether mixtures. The ether-free hydrate has infrared absorption characteristics as follows: 2.8μ, sharp, medium; 3.9μ, sharp, strong; 6.2μ, sharp, medium; 9.25μ, sharp, medium; and 13.9μ, broad, medium.

*Analysis.*—Calc'd for $Na_2B_{12}H_{12} \cdot H_2O$: H, 6.85; B, 63.45; Na, 22.32. Found: H, 6.56; B, 62.02; Na, 20.5.

The elemental analyses may be interpreted as showing the sodium salt to contain the dodecahydrododecaborate anion. As is shown in Example D below, the sodium salt of Example A is converted to a diphosphonium salt whose infrared absorption spectrum shows the same characteristic absorption bands at 4.0μ±0.1 and 9.35μ±0.1 as the disodium salt of Example A. The elemental analysis of the diphosphonium salt shows that the anion is $B_{12}H_{12}^{-2}$.

Example B

A pressure vessel of 80 ml. capacity is charged with 1.9 g. of sodium hydroborate, 2.8 g. of diborane and 10 ml. of glyme. The mixture is heated with agitation under autogenous pressure at 100° C. for 10 hours. The reaction vessel is cooled and it is vented to remove volatile products. It is noted that these products contain about 0.187 mole of free hydrogen and no diborane. The residue in the reaction vessel consists of a while solid suspended in a yellow liquid. The solid is separated by filtration and washed with glyme. After drying, the solid weighs 3.2 g. and it is found by elemental analysis to be polyhydropolyborate containing some unchanged hydroborate.

*Analysis.*—Calc'd for $$Na_2B_{12}H_{12} \cdot 0.36NaBH_4 \cdot 1.16C_4H_{10}O_2 \cdot 1H_2O$$

C, 17.20; H, 8.40; B, 41.27; Na, 16.74. Found: C, 17.07, H, 8.36; B, 40.66; Na, 16.5.

For reasons given earlier the compound is known to be disodium dodecahydrododecaborate (2−) with solvent of crystallization.

Example C

Using the procedure of Example B, a mixture of 2.8 g. of potassium hydroborate, 2.8 g. of diborane and 15 ml. of glyme is heated for 10 hours at 120° C. under autogenous pressure. A total of 0.281 mole of hydrogen is formed. The yellow solid in the reaction vessel is collected on a filter and it is washed with glyme until it is colorless. The solid is dried under very low pressure (less than 1 mm. of mercury) at 90° C. to yield 3.93 g. of a dipotassium polyhydropolyborate (2−), $K_2B_{12}H_{12}$.

Any alkali metal or alkaline earth metal hydroborate can be employed in the method illustrated in Examples A, B, and C, e.g., hydroborates of Li, Cs, Ca, Mg, and Ba can be used. The alkali metal hydroborates, especially $LiBH_4$, $NaBH_4$, and $KBH_4$, are most readily available and they are, therefore, preferred.

*Example D*

A. An aqueous solution of 3.2 g. of $Na_2B_{12}H_{12}$ (with water and glyme of crystallization) is mixed with an aqueous solution of 12 g. of cesium fluoride. A heavy white precipitate forms which dissolves on warming the reaction mixture. On cooling, fine white crystals form which are separated by filtration and dried. There is obtained 3.2 g. cesium dodecahydrododecaborate with solvent (glyme) of crystallization.

B. A solution of 0.89 g. of P,P,P,P′,P′,P′-(hexamethyl)-ethylenediphosphonium bromide in 5 ml. of water is added with stirring to a solution of 1.13 g. of the cesium salt of Part A in 100 ml. of water. A voluminous white precipitate forms. The mixture is boiled to dissolve most of the precipitate. Cooling of the hot solution results in precipitation of a white solid which is separated by filtration. The solid is recrystallized from 1 liter of water to form soft white needles. The product is P,P,P,P′,P′,P′-(hexamethyl)ethylenediphosphonium dodecahydrododecaborate, i.e., $[(CH_3)_3PCH_2CH_2P(CH_3)_3]B_{12}H_{12}$. The identity of the compound is confirmed by the infrared spectrum and by elemental analysis. The product, as obtained, is free of water of hydration.

*Analysis.*—Calc'd for $C_8H_{34}B_{12}P_2$: C, 29.83; H, 10.64; B, 40.29; P, 19.24. Found: C, 29.89; H, 10.94; B, 39.86; P, 19.31.

*Example 1*

An aqueous solution containing 0.43 g. of $$Na_2B_{12}H_{12} \cdot H_2O$$

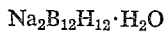

is passed through a 0.5″ diameter chromatography column containing 80 ml. of an acid ion exchange resin known commercially as "Amberlite" IR–120–H. The strongly acid effluent from the column is evaporated to remove all materials volatile at less than 0.001 mm. at 45° C. There remains 0.38 g. of a very white, crystalline, very hygroscopic solid which is dihydrogen dodecahydrododecaborate (2−). The acid has a pKa value at 25° C. of about 2.0 and it titrates as a very strong acid, having an equivalence point at a pH of 7. The infrared absorption spectrum of the acid, which, free of solvent of crystallization, has the formula $H_2B_{12}H_{12}$, shows strong and characterizing absorption in the infrared spectrum at 3.98μ and 9.3μ.

*Example 2*

The process of Example 1 is repeated, employing an aqueous solution of 5.7 g. of $Na_2B_{12}H_{12} \cdot H_2O$. The solution is passed through a 48″ by 1″ (I.D.) ion exchange column packed with an ion exchange resin ("Amberlite" IR–120–H). The acidic eluent from the column is evaporated under reduced pressure in a rotating evaporator. The white crystalline acidic product which remains is dried at 40° C. at 0.05 mm. pressure for 1 hour. The product so obtained is dihydrogen dodecahydrododecaborate with 4 moles of water of hydration, i.e., $H_2B_{12}H_{12} \cdot 4H_2O$ or $(H_3O)_2B_{12}H_{12} \cdot 2H_2O$.

*Analysis.*—Calc'd for $B_{12}H_{22}O_4$: B, 60.11; H, 10.27. Found: B, 60.73; H, 10.40.

*Example 3*

An aqueous solution of 6.10 g. of disodium dodecahydrododecaborate containing water and glyme as solvent of crystallization, is passed through a column (40″ x 1″) packed with an acidic ion exchange resin ("Amberlite" IR–120–H). The acidic eluent is evaporated under reduced pressure to yield dihydrogen dodecahydrododecaborate (2−) in the form of a hydrate as a white, crystalline solid.

Any alkali metal or alkaline earth metal dodecahydrododecaborate can be used in the processes illustrated in Examples 1, 2, and 3. Thus, the potassium derivative of Example C can be employed or the corresponding lithium, cesium, calcium, barium and magnesium derivatives. The sodium and potassium dodecahydrododecaborates are generally used because they are readily available.

Examples 1, 2, and 3 are illustrative of the broad process of metathesis employed in preparing the acid. Modifications of the procedure can be employed. To illustrate, a methanol solution of disodium dodecahydrododecaborate (2−) is treated with hydrogen chloride or with sulfuric acid in methanol solution. The by-product salts, sodium chloride or sodium sulfate, have low solubility in this solvent and they are separated by filtration to obtain a methanol solution of dihydrogen dodecahydrododecaborate (2−). Similarly, an aqueous solution of barium dodecahydrododecaborate (2−) can be reacted with an aqueous solution of sulfuric acid. Barium sulfate, which precipitates, can be separated by filtration and the aqueous filtrate can be evaporated to yield the free acid, $H_2B_{12}H_{12}$, as its hydrate. In like manner, diammonium dodecahydrododecaborate (2−) in aqueous solution can be reacted with dilute hydrochloric acid. The solvent can be removed by evaporation and the solid residue can be heated under reduced pressure to sublime the ammonium chloride. The non-volatile $H_2B_{12}H_{12}$ is obtained as the residue.

The novel acid, with or without solvent of crystallization, is useful as a sequestering agent for metals, especially heavy metals. To illustrate, a mixture of hydrocarbons in the boiling range of gasoline, which contains in solution a copper salt of an organic acid (copper stearate), is thoroughly agitated with an aqueous ammoniacal solution of $H_2B_{12}H_{12}$. The hydrocarbon layer, which is separated from the aqueous reagent, is completely free of the deleterious copper salt.

The new compound is useful as sequestering agents for metals in aqueous media. Thus, copper, nickel, cobalt, zinc and cadmium are removed from aqueous solutions of salts containing these metals by mixing the solutions with an ammoniacal solution of the acid.

The novel acid is useful as an intermediate in the preparation of valuable compounds. The acid is self-catalyzing in a Friedel-Crafts type reaction wherein the $B_{12}H_{12}$ anion is alkylated. To illustrate, the acid or its hydrate can be reacted in aqueous, alcohol or ethereal solutions with olefins to obtain polyhydrododecaborates having hydrocarbon substituents. Thus, a mixture of $(H_3O)_2B_{12}H_{12}$, water, propyl alcohol and propylene can be reacted under autogenous pressure in a closed vessel at about 75–100° C. to obtain compounds having isopropyl groups as substituents, e.g., $$(H_3O)_2B_{12}H_{10}[CH(CH_3)_2]_2.$$

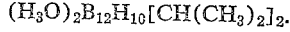

Other substituents which can be introduced on the anion by reaction of the acid with the appropriate olefin are butyl, cyclohexyl, and the like.

The acid is useful in industrial applications, especially in those situations where one desires to avoid contamination from sulfate, chloride, bromide, chlorate, phosphate and like strong acid anions. Thus, the acid is useful for etching metals, such as steel and for rust removal, for pickling, for scale removal and similar metal processing operations.

The substituted derivatives, in the form of salts, are useful as surface active agents, particularly as wetting agents. To illustrate, a glass surface, coated with a film of a silicone, is not wetted when brought into contact with water. The addition of a small quantity of dicesium cyclohexylundecahydrododecaborate to the water results in immediate wetting of the glass surface, i.e., the treated water spreads readily over the surface of the glass. The dicesium cyclohexylundecahydrododecaborate is obtained by reaction of the acid, $H_2B_{12}H_{12}$, with cyclohexene, with subsequent reaction with cesium hydroxide.

The foregoing detailed description has been given for clearness of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. Compounds having the formula $$H_2B_{12}H_{12} \cdot nH_2O$$

where $n$ is a cardinal whole number of less than 5.

2. The acid $$H_2B_{12}H_{12}$$

3. An aqueous solution of $H_2B_{12}H_{12}$.

4. A composition selected from the class consisting of $H_2B_{12}H_{12}$, hydrates thereof, and aqueous solutions thereof.

5. In a process for making dihydrogen dodecahydrododecaborate (2−), the step comprising reacting in solution a salt containing the dodecahydrododecaborate anion $B_{12}H_{12}^{--}$, said salt being selected from the class consisting of ammonium salts, alkali metal salts and alkaline earth metal salts with an acid having a pKa value less than that of the dihydrogen dodecahydrododecaborate (2−) and isolating the resulting acid.

6. In a process for making a substantially pure aqueous solution of the acid of claim 3, the step of contacting with an acidic ion-exchange resin a salt represented by the formula $$M_a(B_{12}H_{12})_b$$

where M is a cation selected from the group consisting of alkali metals, alkaline earth metals and ammonium and $a$ and $b$ are determined by the valence of M and are integers greater than 0 and less than 3 for a time sufficient to exchange the cation of such salt for the acidic hydrogen of the ion-exchange resin.

References Cited in the file of this patent

Lipscomb: J. Phys. Chem. 62, pp. 381–382 (1958).
Lipscomb: Abstracts of Papers, 133rd, ASC Meeting, San Francisco.